United States Patent [19]
Junk

[11] Patent Number: 6,128,541
[45] Date of Patent: Oct. 3, 2000

[54] OPTIMAL AUTO-TUNER FOR USE IN A PROCESS CONTROL NETWORK

[75] Inventor: Kenneth W. Junk, Marshalltown, Iowa

[73] Assignee: Fisher Controls International, Inc., Clayton, Mo.

[21] Appl. No.: 08/950,954

[22] Filed: Oct. 15, 1997

[51] Int. Cl.[7] .................................................. G05B 13/02
[52] U.S. Cl. ............................... 700/39; 700/17; 700/31; 700/34; 700/36; 700/83; 455/125; 455/170.1; 455/173.1
[58] Field of Search .................................. 700/17, 42, 31, 700/34, 36, 37, 39, 83; 455/125, 170.1, 173.1; 116/29, 30, 200, 241, 337

[56] References Cited

U.S. PATENT DOCUMENTS

| | | | |
|---|---|---|---|
| 3,767,900 | 10/1973 | Chao et al. | 364/151 |
| 4,245,162 | 1/1981 | Ronnen et al. | 290/40 R |
| 4,349,868 | 9/1982 | Brown | 364/157 |
| 4,549,123 | 10/1985 | Hägglund et al. | 318/610 |
| 4,881,160 | 11/1989 | Sakai et al. | 364/161 |
| 5,159,547 | 10/1992 | Chand | 364/157 |
| 5,301,101 | 4/1994 | MacArthur et al. | 364/156 |
| 5,431,182 | 7/1995 | Brown | 137/85 |
| 5,558,115 | 9/1996 | Lenz et al. | 137/86 |
| 5,587,896 | 12/1996 | Hansen et al. | 364/148 |
| 5,818,714 | 10/1998 | Zou et al. | 364/154 |

FOREIGN PATENT DOCUMENTS

| | | |
|---|---|---|
| 0 241 286 | 10/1987 | European Pat. Off. . |
| 2 731 810 | 9/1996 | France . |

OTHER PUBLICATIONS

PCT/US 98/15771 PCT Written Opinion, dated Jul. 22, 1999.

Aström and Hägglund, "Automatic Tuning PID Controllers," *Instrument Society of America*, pp. 37–45, 108–110 and 120–126 (1988).

Aström et al., "Automatic Tuning of PID Controllers," *Instrument Society of America*, pp. 51–61 and 105–132 (1988).

Goodwin et al., "Adaptive Filtering Prediction and Control," *Computer Special Systems Digital Equipment*, pp. 426–465 (1984).

Kwakernaak et al., "Linear Optimal Control Systems," *Wiley–Interscience*, pp. 253–269 (1972).

Bryson, Jr. et al., "Applied Optimal Control," *Hemisphere Publishing Corporation*, pp. 408–437 (1975).

Siemens Sipart•PS 6DR3000–1N/E–2N/E, pp. 29–62 (1991).

Masoneilan Product Brochure, "Smart Valve Interface (SVI) User's Manual–Digital Valve Positioner and Process Controller," Dresser Industries, 30 pages (1997).

Masoneilan User's Manual, "ValVue™ Software User's Manual," Dresser Industries, 59 pages (Jan. 1997).

PCT/US 98/15771 International Search Report, dated Oct. 20, 1998.

Orelind et al., "Optimal PID Gain Schedule for Hydrogenerators–Design and Application," 8047d *IEEE Transactions on Energy Conversion*, vol. 4, No. 3, pp. 300–307 (Sep. 1989).

*Primary Examiner*—William Grant
*Assistant Examiner*—McDieunel Marc
*Attorney, Agent, or Firm*—Marshall, O'Toole, Gerstein, Murray & Borun

[57] ABSTRACT

A device and method that automatically tune a valve controller coupled to a process control loop generate a plurality of sets of tuning parameters for use by the controller, deliver a test signal, such as a blocked sinusoidal signal, to the controller to force the process control loop through a test cycle while each of the plurality of sets of tuning parameters are being used by the controller and measure a response of the process control loop during each of the test cycles. The device and method then calculate a performance index for each of the plurality of sets of tuning parameters based on the measured responses and select one of the sets of tuning parameters based on the calculated performance indices. The selected set of tuning parameters is then loaded into the controller for use during normal operation of the process control loop.

30 Claims, 3 Drawing Sheets

OPTIMAL AUTO-TUNER FOR USE IN A PROCESS CONTROL NETWORK

TECHNICAL FIELD

The present invention relates generally to auto-tuners for use in process control networks and, more particularly, to process control auto-tuners that determine an optimal set of tuning parameters for use in controlling a process or for use in controlling a valve positioner and a valve device in a process environment.

DESCRIPTION OF RELATED ART

Beginning in the middle of the 1950's, auto-tuning or self-tuning process controllers have been used in certain industries, such as the aerospace and process control industries, to automatically determine a set of tuning parameters, such as a set of gains, for use in controlling a process or a process control device such as a valve. Generally speaking, these self-tuning or adaptive controllers implement a system identification procedure that determines one or more characteristics of a process or a device and a control design procedure that determines an appropriate set of tuning parameters based on the determined process or device characteristics.

System identification procedures typically induce controlled oscillation within a process or a device, measure the values of one or more process variables during the controlled oscillation and then determine certain process or device characteristics, such as the ultimate gain, the ultimate period and the time delay of the process or the device based on the measured variables. These system identification procedures then use the process or the device characteristics to identify the type of process or device being controlled based on standard mathematical procedures. Alternatively, some system identification procedures perform model matching or signature analysis techniques to determine which of a set of stored mathematical models (or process signatures) most closely matches or fits the data associated with the measured process variables.

After the characteristics of a process or a device are derived, or a model for the process or device is determined, the process or device is identified as being one of a number of different types of, for example, linear processes so that a set of defining equations may be generated therefor. The control design procedure then calculates or otherwise determines an appropriate set of tuning parameters (such as gains) based on the results of the system identification procedure and loads these tuning parameters into a process controller or a device controller for use in controlling the process or the device.

Because auto-tuning or adaptive controllers have been known for a significant amount of time, many system identification strategies, such as recursive least squares approaches, Poisson moment functional approaches and describing function approaches, have been developed to characterize a process or a device. Likewise, many control design strategies, such as pole-placement methods, Zeigler-Nichols methods, and modified Zeigler-Nichols methods, have been developed to determine a set of tuning parameters for use in controlling a process or a device after such process or device has been characterized. One of the most versatile control design techniques uses the linear quadratic Gaussian (LQG) approach to select a set of tuning parameters for a controller. However, most of these known methods, including the LQG approach, are only optimal when used with linear processes or devices or when used in processes or devices for which a set of linear equations can be identified. Consequently, most of these approaches, including the LQG approach, are sub-optimal when used to determine a set of tuning parameters for controlling processes or process control devices, such as control valves, that are non-linear in nature or that include peculiar and hard-to-quantify non-linear regions.

SUMMARY OF THE INVENTION

The auto-tuner of the present invention uses a systematic experimental approach to determine a set of tuning parameters, such as a set of gains, for use in controlling a process or a process control device and, as a result, does not need to explicitly characterize a process or a device which, in turn, enables the auto-tuner of the present invention to develop an optimal set of tuning parameters for both linear and non-linear processes and process control devices.

In general, the auto-tuner of the present invention forces a process or a process control device through a test cycle using each of a plurality of different sets of tuning parameters, measures the response of the process or the process control device during each of the test cycles and determines which of the sets of tuning parameters minimizes a predefined performance index. The auto-tuner of the present invention then loads the determined set of tuning parameters in a controller which controls the process or the process control device during normal operation.

According to one aspect of the present invention, an auto-tuner develops a set of operational tuning parameters, such as a set of gains, for use by a process or a device controller that is connected within a process to receive a reference signal. The auto-tuner includes a tuning parameter generator that generates a plurality of sets of tuning parameters for use by the controller during a tuning procedure, a test signal generator that delivers a test signal to the controller as the reference signal during the tuning procedure and a data collector adapted to receive measurements of an input variable and an output variable associated with the process during the tuning procedure. A performance index generator determines a performance index associated with each of the plurality of sets of tuning parameters from the measurements of the input variable and the output variable and, thereafter, a tuning parameter selection unit selects one of the plurality of sets of tuning parameters as the set of operational tuning parameters based on the performance indices.

Preferably, the controller is coupled within a process control system to drive a valve positioner that is connected to a valve actuator/valve device via a fluid pressure line. In such a configuration, the data collector may be coupled to the valve positioner and to the valve to collect data pertaining to, for example, the valve position, the drive signal delivered to or developed by the valve positioner and one or more intermediate state variables such as the actuator pressure within the valve actuator.

Also, preferably, the test signal generator develops a blocked sinusoidal signal or some other test signal that includes a multiplicity of discrete changes therein and the data collector collects a series of measurements for the input variable and for the output variable after each of the discrete changes in the test signal for each of the plurality of sets of tuning parameters. Moreover, the performance index generator may calculate the performance index associated with each of the plurality of sets of tuning parameters as an expected value of performance indices associated with each of the discrete changes in the test signal or as a combination of a norm of a difference between the reference signal and the output variable and a norm of the input variable.

According to another aspect of the present invention, an auto-tuner that develops a set of operational tuning parameters for a valve positioner includes a data collector coupled to a valve to collect data pertaining to an input variable and to an output variable and includes a signal generator that delivers a predetermined test reference signal to the valve positioner during a tuning procedure. The auto-tuner also includes a computer program embodied on a computer readable medium that performs the steps of generating a plurality of sets of tuning parameters for use by the valve positioner during the tuning procedure, calculating a performance index associated with each of the plurality of sets of tuning parameters from the collected data pertaining to the input variable and the output variable and selecting one of the plurality of sets of tuning parameters as the set of operational tuning parameters based on the performance indices.

According to a still further aspect of the present invention, a method of automatically tuning a controller coupled to a process control loop includes the steps of generating a plurality of sets of tuning parameters for the controller, forcing the process control loop through a test cycle while the controller uses each of the plurality of sets of tuning parameters, measuring a response of the process control loop during the test cycle associated with each of the plurality of sets of tuning parameters and calculating a performance index for each of the plurality of sets of tuning parameters based on the measured responses. Thereafter, the method selects one of the set of tuning parameters as a set of operational tuning parameters for the controller based on the calculated performance indices and loads these operational tuning parameters into a controller.

DETAILED DESCRIPTION OF THE PREFERRED EMBODIMENTS

Figure 1:
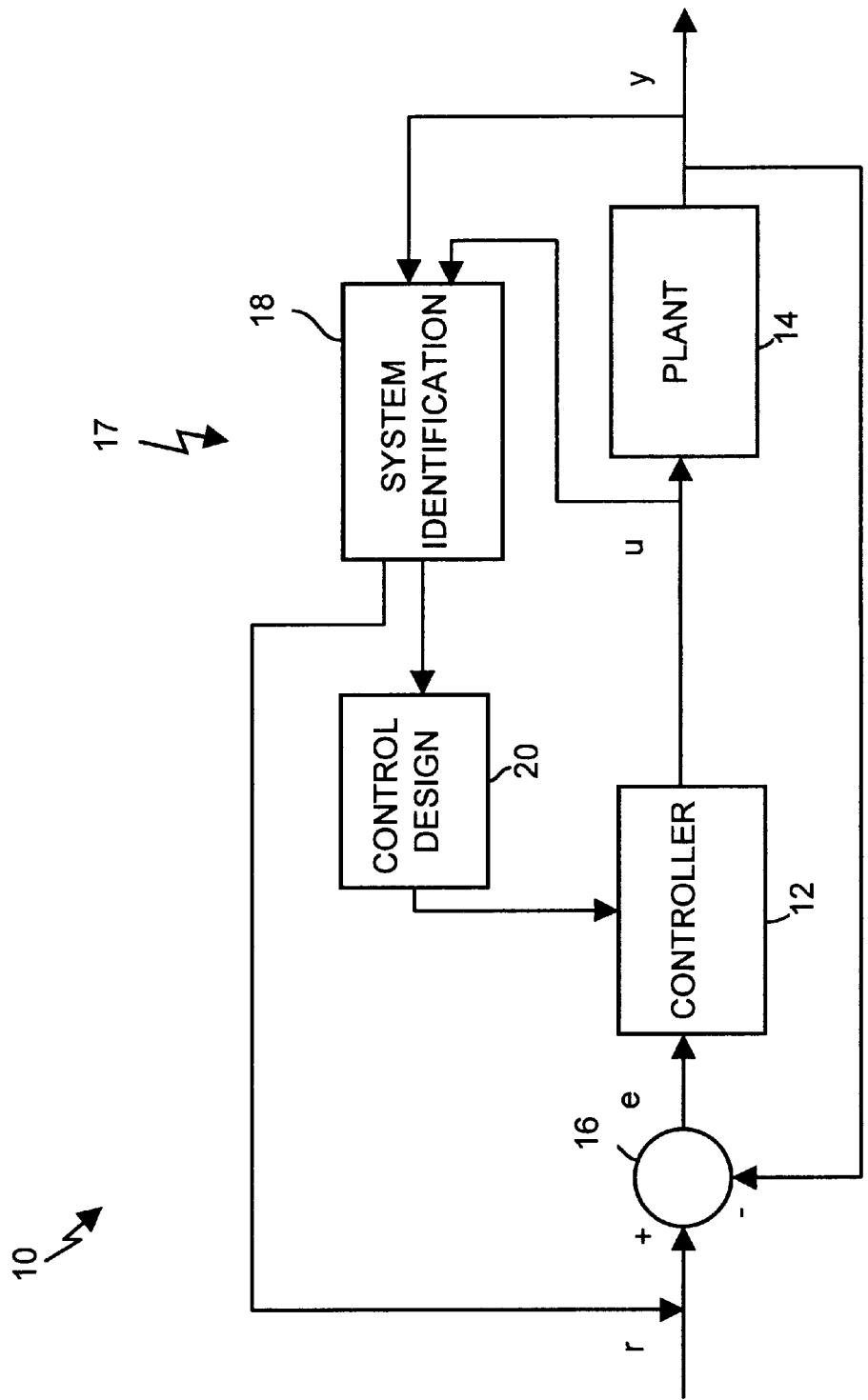
FIG. 1 is a block diagram of a process control loop including a prior art auto-tuner and controller.

Referring now to FIG. 1, a standard process control system or loop 10 includes a controller 12 that produces a control or drive signal (u) which controls the operation of a process or a plant 14. A process variable (y) developed by the plant 14 is fed back to a summer 16, where it is subtracted from a reference signal or set point (r) to produce an error signal (e) which, in turn, is provided to the controller 12. The controller 12 implements a standard control algorithm that changes the drive signal u so as to force the process variable y to match the set point r whenever the error signal e is non-zero.

The process control system 10 also includes an auto-tuner 17 having a system identification block 18 and a control design block 20. The auto-tuner 17 implements a tuning procedure to develop a set of tuning parameters, such as a set of gains, for use by the controller 12. During such a tuning procedure, the system identification block 18 provides a forcing function (such as a square wave signal) to the summer 16 as the reference signal r which, in turn, causes the plant 14 to go into a state of controlled induced oscillation. At this time, the system identification block 18 measures the control or drive signal u and the process variable y and uses these measured signals to characterize the plant 14 or to characterize a performance index associated with the plant 14 according to any standard process identification or modeling technique. While the auto-tuner 17 is illustrated in FIG. 1 as implementing system identification in a closed-loop manner, the auto-tuner 17 may implement system identification in an open-loop manner as well.

After the system identification block 18 has characterized the plant 14, the defining characteristics are provided to the control design block 20 which develops a set of tuning parameters for use in the controller 12 based on the identified characteristics of the plant 14. In some prior art systems, the control design block 20 uses a linear quadratic Gaussian (LQG) approach to select an appropriate set of gain values.

The LQG approach can be generally implemented by solving for equation (1) below which is constrained by equations (2), (3) and (4). The coefficients in equations (2) and (3) may be estimated by, for example, the system identification block 18. Equation (4) describes the feedback structure and does not have to be estimated.

$$\min_k J = E\left\{ x^T[N]Sx[N] + \sum_{i=0}^{N-1}(x^T[i]Rx[i] + u^T[i]Qu[i]) \right\} \quad (1)$$

$$x[i+1] = Ax[i] + Bu[i] + w_1[i] \quad (2)$$
$$y[i] = Cx[i] + Du[i] + w_2[i] \quad (3)$$
$$u[i] = k[i]x[i] \quad (4)$$

wherein:

| | |
|---|---|
| $k[i]$ = | a gain vector at the ith time period; |
| $J$ = | a performance index; |
| $N$ = | the number of measured samples used to determine the performance index; |
| $x[i]$ = | the plant state vector at the ith time period; |
| $u[i]$ = | the drive signal vector at the ith time period; |
| $y[i]$ = | the output variable vector at the ith time period; |
| $w_1[i]$ = | a Gaussian random plant disturbance vector at the ith time period; |
| $w_2[i]$ = | a Gaussian random measurement disturbance vector at the ith time period; |
| A, B, C, D = | matrixes that describe the dynamics of the plant 14; and |
| S, R, Q = | weighting coefficient matrixes that identify a preferred optimal operation of the plant 14. |

For the purpose of clarity, all vector variables are indicated herein by bold, lower-case letters, all matrixes are indicated by bold, upper-case letters and all scalars are indicated by standard font. The expression $E\{f(x)\}$ identifies the expected value of the function $f(x)$ while the expression $\min_k J$ minimizes the scalar J with respect to the vector k.

As will be understood from the above equations, when using the LQG approach, the control design block 20 solves equation (1) to identify the gain vector k associated with the minimum performance index J for an identified set of plant dynamics (defined by the matrixes A, B, C and D) and for a given optimal performance index (defined by the weighting coefficient matrixes S, R and Q).

The right side of equation (1) can generally be thought of as the expected value of the sum of three penalizing components. The first penalizing component $$x^T[N]Sx[N]$$

places a penalty on the final value of the state vector x. Thus, when the final components of the state vector x are non-zero, the performance index J is increased by an amount proportional to sum of the squares of those components multiplied by the weighting coefficient matrix S. The second penalizing component $$\sum_{i=0}^{N-1} x^T[i]Rx[i]$$

places a penalty on movement (for example, slow or oscillatory movement) of the state vector x in response to a change in the control or drive vector u. Movement of the state vector x in a manner that causes non-zero-valued components of the state vector x increases the performance index J as a function of the summation of the squared error of the state vector x multiplied by the weighting matrix R. The third component $$\sum_{i=0}^{N-1} u^T[i]Qu[i]$$

places a penalty on large values of the input or drive vector u. Large values of the drive vector u cause the performance index J to increase by a function of the summation of the squared value of the drive vector u multiplied by the weighting matrix Q.

If the plant 14 is linear and its parameters are well known or can be identified, a closed-form solution for the gain vector k can be found which leads to optimal control of the plant 14. For most known self-tuning or adaptive controllers using the LQG approach, the matrices A, B, C and D are estimated on-line and equation (1) is solved to identify the gain vector k associated with optimal performance of the controller 12.

However, as indicated above, self-tuning algorithms, such as those that use the LQG approach, are sub-optimal when used in situations in which the process or device dynamics are highly non-linear or when they have strong stochastic components because, under these conditions, is it difficult or nearly impossible to identify a set of equations that accurately defines the operation of the process or the device. Furthermore, many self-tuning algorithms are sensitive to noise, such as process noise or measurement noise, and are incapable of operating optimally when a high level of noise is present within the signal being used to characterize the plant. In many cases, known self-tuning algorithms operate satisfactorily only when the noise within the signal being measured is less than about one percent of that signal.

Figure 2:
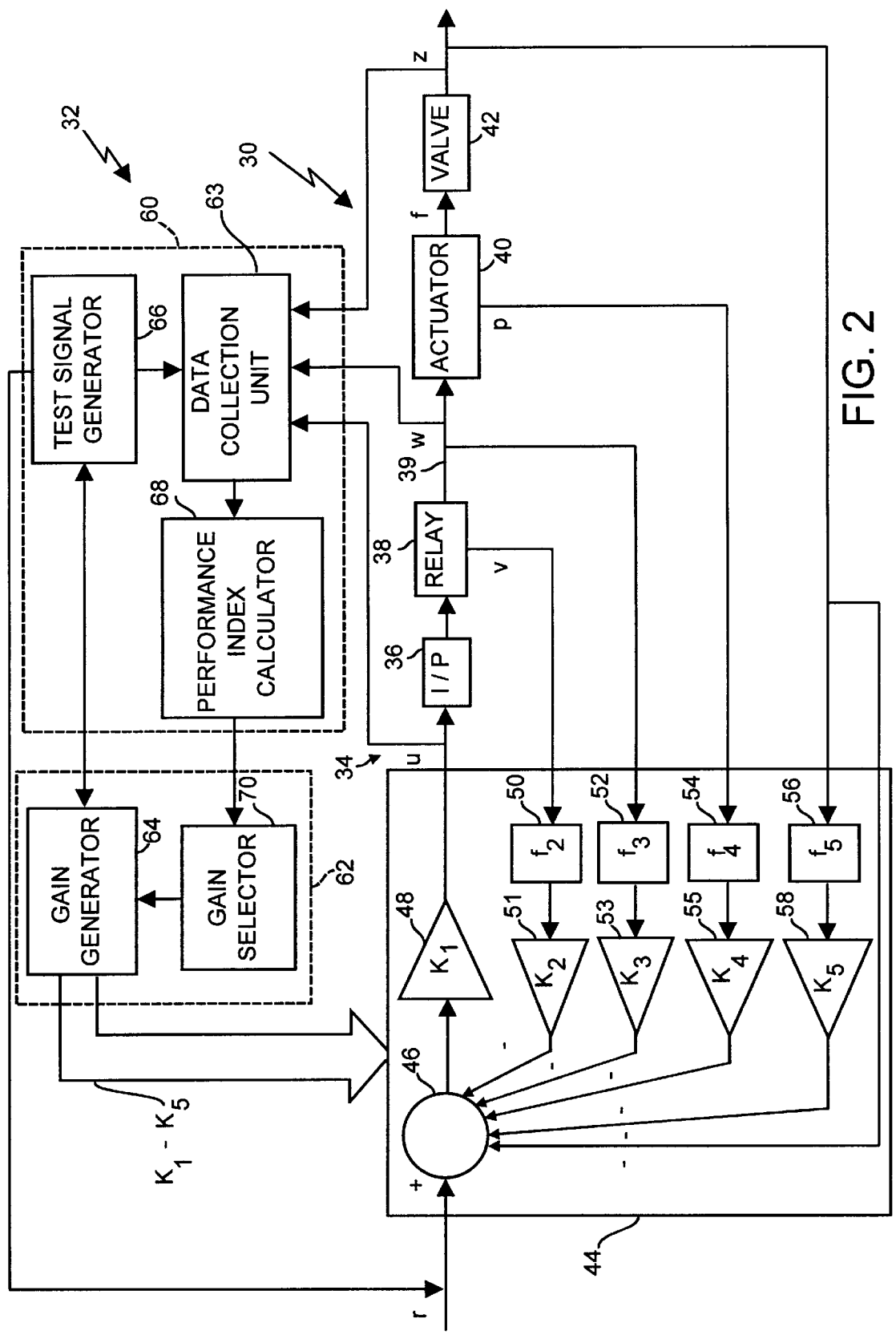
FIG. 2 is a block diagram of a process control loop including a positioner, a control valve and an auto-tuner according to the present invention.

Referring now to FIG. 2, a process control loop 30 having an auto-tuner 32 that overcomes these problems is illustrated in detail. As will be evident, the process control loop 30 includes a positioner 34 having a current-to-pressure (I/P) transducer 36 coupled to a pressure relay 38. The pressure relay 38 may be modeled by a first non-linear gain function that uses the output of the I/P transducer 36 to produce a relay travel (v) and by a second non-linear gain function that uses the relay travel v to produce a controlled amount of air flow (w) in a fluid line 39 connected to the output of the relay 38. An actuator 40 is connected through the fluid line 39 to the relay 38 and uses the air flow in the line 39 to produce pressure (p) over an actuating area to thereby produce a force (f) which causes movement of a valve element within a valve 42.

A controller 44 (which may be part of the valve positioner 34) is connected within the process control loop 30 to receive a set point or reference signal r and one or more process or device parameters which may be, for example, the valve position z, the pressure p within the actuator 40, the air flow w within the fluid line 39 and the relay travel v in the relay 38. Of course, these signals may be measured by any suitable measuring device and other signals, such as other device or process parameters, including process variables, may be used by the controller 44 if so desired.

As illustrated in FIG. 2, the controller 44 includes a summer 46 that subtracts signals developed by five feedback paths from the reference signal r to develop an error signal on a forward path. The forward path includes an amplifier 48 that multiples the error signal by a gain $K_1$ and delivers the output of the amplifier 48 to the I/P transducer 36 as the control or drive signal u. The first feedback path of the controller 44 includes a transfer function block 50 sensitive to the relay travel v and an amplifier 51 that multiplies the output of the block 50 by a gain $K_2$. The second feedback path includes a transfer function block 52 sensitive to the air flow w and an amplifier 53 that multiplies the output of the block 52 by a gain $K_4$. Likewise, the third feedback path includes a transfer function block 54 sensitive to the actuator pressure p and an amplifier 55 that multiplies the output of the block 54 by a gain $K_4$ while the fourth feedback path includes a transfer function block 56 sensitive to the valve position z and an amplifier 57 that multiplies the output of the block 56 by a gain $K_5$. The fifth feedback path simply provides the valve position z to the summer 46. As will be understood, the transfer function blocks 50, 52, 54 and 56 may be, for example, filters, and may implement any desired type(s) of transfer functions. Of course, the specifics of the controller 44 of FIG. 2 are merely exemplary, it being understood that other feedback and forward paths could be alternatively or additionally used and that the controller 44 could implement any other type of control scheme including, for example, a proportional-integral (PI) control scheme, a proportional-integral-derivative (PID) control scheme, an internal model control (IMC) scheme, etc.

The auto-tuner 32 includes a system quantification unit 60 and a gain selection unit 62 that operate to implement a tuning procedure which selects or determines an optimal set of tuning parameters, such as a set of gains $K_1, K_2, \ldots, K_5$, for use by the controller 44. Generally speaking, during the tuning procedure, the gain selection unit 62 sends a plurality of different sets of gain values to the controller 44 and the system quantification unit 60 sends a test reference signal or a forcing function to the reference signal input of the controller 44 for each of the sets of gain values. During this time, the system quantification unit 62 measures data indicative of the operation of the loop 30 and determines, from the measured data, a performance index J associated with the control of the positioner 34 and/or the valve 42 for each of the sets of gain values. The gain selection unit 62 then selects the set of gains associated with the minimum performance index J and stores these gains in the controller 44 for use in controlling the positioner 34 and the valve 42 during normal operation of the process control loop 30.

As illustrated in FIG. 2, the system quantification unit 60 includes a data collection unit 63 that collects and stores measurements of one or more variables which may be, for example, an input variable such as the drive signal u, one or more intermediate state variables such as the relay travel v, the air flow w, the actuator pressure p, etc., and one or more output variables such as the valve position z or any suitable process variable. Of course, if desired, the data collection unit 63 may be responsive to other desired input variables, intermediate variables and/or output variables including, for example, the output of the summer 46, the output of the I/P transducer 36, an indication of movement of the actuator 40, or any other signal indicative of the control or operation of the positioner 34 or the valve 42. Likewise, the data collection unit 63 may collect other signals besides the drive signal u as the input variable including, for example, the relay travel v or one of the other intermediate variables. Also, the data collection unit 63 may collect other signals as the output variable including, for example, the force developed by the actuator 40.

During a tuning procedure, a gain generator 64 within the gain selection unit 62 provides a first set of gain values (e.g., $K_1, K_2, \ldots, K_5$) making up a gain vector k to the controller 44. A test signal generator 66 within the system quantification unit 60 then provides a forcing function or test signal to the set point or reference input of the controller 44. If desired, the forcing function may be similar to that illustrated in FIG. 3 which includes an initialization phase (which causes the valve 42 to move through a dead band to a particular location) followed by a test phase having a repeating or periodic blocked sinusoidal waveform associated therewith. After each change in the forcing function during each period of the test phase, e.g., beginning at each of the times $T_1, T_2, T_3$ and $T_4$ in period 1 of FIG. 3, the data collection unit 63 measures and records N values or time samples of one or more input variables, for example, the drive signal u, zero or more intermediate state variables, such as the air flow w or the actuator pressure signal p, and one or more output variables, such as the valve position z. Using this recorded data, a performance index calculator 68 calculates or determines a performance index J according to, for example, the following equation (which assumes that the drive signal u is the only measured input variables and the that valve position z is the only measured output variable):

$$\min_k J = E\left\{ \sum_{i=0}^{N-1} (|(r[i] - r[0]) - (z[i] - z[0])| + \eta |u[i] - u[0]|) \right\} \quad (5)$$

wherein:
k = the gain vector comprising, for example, the gains $K_1, K_2, \ldots, K_5$;
N = the number of time samples for which data is collected for the input variable u and the output variable z after each change in the forcing function r;
r[i] = the value of the reference signal or forcing function at the ith time sample;
z[i] = the value of the valve position (or other output variable) at the ith time sample;
u[i] = the value of the drive signal (or other input variable) at the ith time sample; and
$\eta$ = a scalar weighting coefficient (experimentally chosen to be approximately 0.3).

Figure 3:
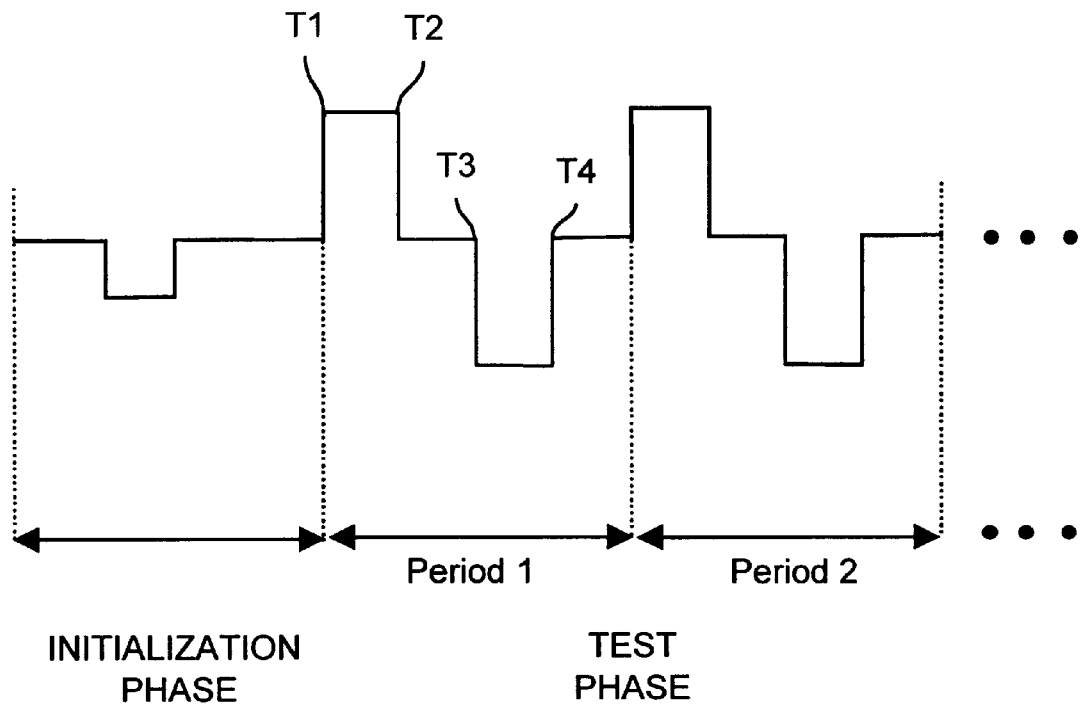
FIG. 3 is a diagram illustrating a control waveform used by the auto-tuner of the present invention.
Figure 4:
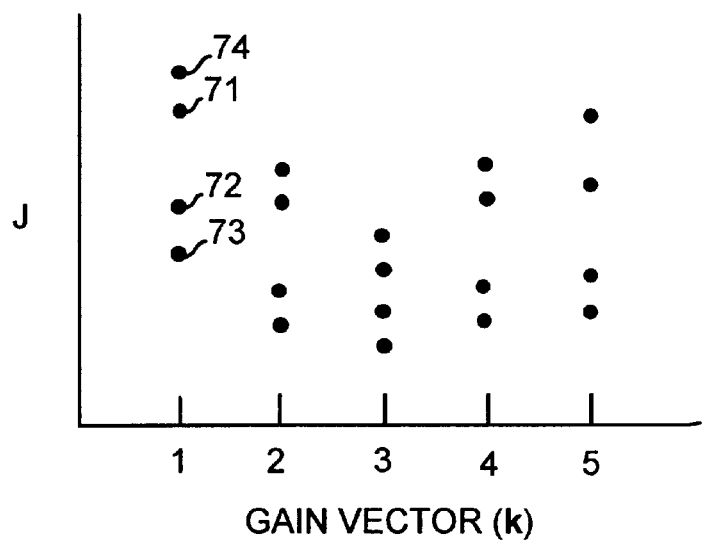
FIG. 4 is a plot of a performance index (J) associated with five different sets of gain vectors (k) calculated according to the tuning procedure of the present invention.

As will be understood, the function within the brackets { } of equation (5) is calculated for N points or time samples after each change in the reference signal r resulting in four different calculations of the performance index J for each period of the blocked sinusoidal waveform of FIG. 3. These different calculations of the performance index J are desirable to fully quantify the controlled operation of the valve 42 during each different type of movement thereof. The graph of FIG. 4 illustrates the values of the performance index J defined by the function within the brackets { } of equation (5) for five different sets of gain values (i.e., for five different gain vectors k). At each set of gain values, four separate J points are illustrated and a different one of these four J values is associated with a different one of the changes in the forcing function of FIG. 3. For example, at the first set of gain values of FIG. 4, a first J value 71 is associated with the change in the forcing function r at the time $T_1$, a second J value 72 is associated with the change in the forcing function r at the time $T_2$, a third J value 73 is associated with the change in the forcing function r at the time $T_3$ and a fourth J value 74 is associated with the change in the forcing function r at the time $T_4$. According to equation (5), the expected value (e.g., the average) of the J values associated with each of the changes in the forcing function r of FIG. 3 for a particular set of gains is determined by the performance index calculator 68.

After the performance index J is calculated for a first gain vector k (or the data necessary for that calculation is collected), a new set of gain values ($K_1, K_2, \ldots, K_5$) or gain vector k is chosen by the gain generator 64 and is sent to the controller 44 by the gain selection unit 62. At this time, the second period of the blocked sinusoidal forcing function of FIG. 3 is delivered to the reference signal input of the controller 44 and the response of the process control loop 30, the positioner 34 and/or the valve 42 is measured by the data collection unit 63. If desired, the second period of the blocked sinusoidal signal may include the initialization phase to assure that the valve 42 is in the same position as it was in when tested with the first set of gains. Thereafter, the performance index calculator 68 determines the performance index J associated with each of the movements of the forcing function r for this second set of gain values using equation (5) above. This procedure is repeated for any number of sets of gain values or gain vectors k. Five sets of four J values for five different sets of gain vectors k are illustrated in the graph of FIG. 4, wherein the third set of gain values is associated with the minimum expected value of the performance index J over the four changes in each period of the blocked sinusoidal waveform of FIG. 3.

Of course, the gain generator 64 may choose or develop the different sets of gain values k in any desired manner. For example, one of the gains, such as $K_1$ may be varied and the other gains $K_2$, $K_3$, $K_4$ and $K_5$ may be calculated as a function of $K_1$. Alternatively, other minimization routines may be employed including, for example, a Nelder-Mead downhill simplex method, a simulated annealing method or a multi-dimensional conjugate gradient method, to name but a few. Still further, predetermined sets of gains may be stored in a memory and retrieved by the gain generator 64. Preferably, however, the different gain vectors k are chosen to cover the stable operating range of the process control loop 30 or the positioner 34 and valve 42 combination so that a local or global optimal set of gains may be determined at the end of the tuning procedure.

After all of the different sets of gain values or gain vectors k are stored in the controller 44 and are used during a test cycle to operate the process control loop 30, a gain selection unit 70 determines which set of gains (i.e., which gain vector k) produced the minimum expected value of the performance index J and then directs the gain generator 64 to load those gain values in the controller 44. Thereafter, the process control loop 30 operates using the chosen set of gains until another tuning procedure is implemented. Of course, the tuning procedure described herein may be repeated at any time, including when the process loop or positioner/valve combination is either on-line or off-line.

It is important to note that equation (5) does not specify or require a plant model or a set of equations defining any operation of a process control loop or a process control device. As a result, this equation may be used to determine an optimal set of gains (or other tuning parameters) for use in controlling any type of system or device, including any system or device that has non-linear characteristics and any system or device that uses non-Gaussian random processes, such as the processes associated with control valves and control valve positioners.

Furthermore, the auto-tuner and tuning procedure described herein may use other performance index calculations that compute a norm in a vector space. These other performance index calculations may be generally expressed by the following equation:

$$\min_k J = E\{\alpha\|r - z\| + \beta\|u\| + \gamma\|p\|\} \quad (6)$$

wherein:

$\alpha, \beta, \gamma$ = constants;

$r$ = a reference signal;

$z$ = an output variable, such as a valve position;

$u$ = an input variable, for example, a drive signal; and $p$ = an intermediate variable, for example, a pressure signal.

$\|*\|$ denotes a norm, which may be, for example, a summation of an absolute value, a summation of a squared value, a supremum, a power signal (such as an RMS signal), or any other vector space norm. Choosing the absolute value norm, as in equation (5), tends to sharpen the minimum. Furthermore, more or less input variables and intermediate variables could be used in equation (6) while the differences between a reference signal and other output variables could also be added to equation (6), as desired.

Still further, any other forcing function, including a forcing function with only a single change, two changes, etc. may be used to test each of the different sets of gain values according to the present invention. However, it is preferable to use a forcing function that causes movement of a valve (or that operates any other device or loop under test) in each of the operating regions of that the device or loop.

Of course, the components of the system quantification unit 60 and gain selection unit 62 may be implemented in software in any appropriately programmed processor, such as a microprocessor, or, alternatively, may be implemented in hardware, firmware or any combination of software and hardware. Thus, for example, the data collection unit 63 may be any analog or digital storage unit coupled to a measurement device that measures the appropriate signals. Likewise, the test signal generator 66 may store one or more test signals in memory and send an analog or digital signal to the reference signal input of the controller 44 using any standard or known method. Alternatively, the test signal generator 66 may be any known analog signal generator. Likewise, the gain generator 64 may generate gains in any suitable manner and, if desired, may generate gains in different manners selectable by a user. Preferably, the gain generator 64, the gain selector 70, and the performance index calculator 68 are implemented in software on a microprocessor but may, instead, be implemented in hardware or firmware.

The self-tuner 32 may be located in the controller 44, in a stand-alone unit, in the positioner 34, in the valve 42 or in any other device capable of accepting inputs from the process control loop 30 and of calculating gains and minimum values according to, for example, equation (5) or equation (6). Likewise, the tuning procedure of the present invention may determine any other desired tuning parameters besides gains including, for example, time constants of filters, etc. While the tuning procedure of the present invention is very useful in controlling valves and valve positioners (which are highly non-linear), the tuning procedure of the present invention may be used to develop tuning parameters for any process control loop or system including process control systems that include devices other than control valves and control valve positioners. However, for purposes of this invention, a valve positioner and valve device combination is considered to be a process control loop while a valve positioner is considered to be a device controller as well as a process controller. When the auto-tuner described herein is used to tune an entire process control loop or system, the reference signal will typically be an operator input (instead of an output of a process controller), the input variable may be an output of the process controller and the output variable may be a process variable.

It will be understood that the auto-tuning technique described herein is non-parametric and, as a result, does not require a parametric identification algorithm that identifies a process or a device. To the contrary, this technique can be applied to any algorithm or any process control system including linear and non-linear components. In particular, this technique can be applied to highly non-linear and highly variable systems such as control valves and does not require the usual assumptions of Gaussian random process disturbances. Furthermore, this technique does not require variations of the performance index J to be stationary with respect to changes in gain. Moreover, by incorporating measures of the drive signal u or, alternatively, intermediate signals such as the relay travel v or the actuator pressure p in the performance index J, the technique of the present invention enables one to "see inside" the positioner 34 and the actuator 40 to detect marginally stable behavior before it becomes a problem in valve travel. Still further, instead of tuning a positioner for stability, the auto-tuner of the present invention tunes optimally, which minimizes the dead time and the response time of a control valve while maintaining a reasonably stable drive signal. Also, unlike many describing function auto-tuners, the auto-tuner of the present invention does not require controller feedback gains to be located in a forward control path but, instead, allows gains to be applied in any desired manner, including in reverse control paths.

While the present invention has been described with reference to specific examples which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An auto-tuner for developing a set of operational tuning parameters for use by a controller that receives a reference signal and that develops a drive signal to effect changes in an output variable, the auto-tuner comprising:

a tuning parameter generator that generates a plurality of sets of tuning parameters for use by the controller during a tuning procedure;

a test signal generator that delivers a test signal to the controller as the reference signal during the tuning procedure;

a data collector adapted to receive measurements of an input variable and the output variable during the tuning procedure;

a performance index generator that determines a performance index associated with each of the plurality of sets of tuning parameters from the measurements of the input variable and the output variable; and a tuning parameter selection unit that selects one of the plurality of sets of tuning parameters as the set of operational tuning parameters based on the performance indices.

2. The auto-tuner of claim 1, wherein the controller is a device controller and is coupled within a process control system to drive a valve and wherein the data collector is coupled to the valve to collect data pertaining to the valve.

3. The auto-tuner of claim 2, wherein the output variable is indicative of a valve position.

4. The auto-tuner of claim 2, wherein the input variable comprises the drive signal developed by the device controller.

5. The auto-tuner of claim 2, wherein the data collector is further adapted to receive a measurement of an intermediate variable during the tuning procedure and wherein the performance index generator determines the performance indices as a function of the intermediate variable.

6. The auto-tuner of claim 5, wherein the intermediate variable is a valve actuator pressure.

7. The auto-tuner of claim 1, wherein the test signal generator develops a blocked sinusoidal signal during the tuning procedure.

8. The auto-tuner of claim 1, wherein the test signal generator develops a test signal that includes a multiplicity of discrete changes therein and wherein the data collector collects a series of measurements for the input variable and for the output variable after each of the discrete changes in the test signal for each of the plurality of sets of tuning parameters.

9. The auto-tuner of claim 8, wherein the performance index generator calculates the performance index associated with each of the plurality of sets of tuning parameters as an expected value of further performance indices for each of the discrete changes in the test signal.

10. The auto-tuner of claim 1, wherein the tuning parameters comprise gains.

11. The auto-tuner of claim 1, wherein the performance index generator calculates the performance index as a function of a norm of a difference between the reference signal and the output variable and as a function of a norm of the input variable.

12. The auto-tuner of claim 1, wherein the performance index generator calculates the performance index generally according to the equation:

$$\min_k J = E\left\{\sum_{i=0}^{N-1} (|(r[i] - r[0]) - (z[i] - z[0])| + \eta|u[i] - u[0]|)\right\}$$

wherein:

$J$ = the performance index;

$k$ = a set of the tuning parameters;

$r[i]$ = the value of the reference signal at the ith time sample;

$z[i]$ = the value of the output variable at the ith time sample;

$u[i]$ = the value of the input variable at the ith time sample;

$N$ = a number of time samples for which data is collected for the input variable $u$ and the output variable $z$; and $\eta$ = a weighting coefficient.

13. The auto-tuner of claim 1, wherein the tuning parameter selection unit selects the set of tuning parameters associated with the minimum performance index as the set of operational tuning parameters.

14. The auto-tuner of claim 1, wherein the controller is a process controller and wherein the output variable is a process variable.

15. An auto-tuner for developing a set of operational tuning parameters for a valve positioner that controls an output variable associated with a valve in response to a reference signal, the auto-tuner comprising:

a data collector coupled to the valve positioner and the valve to collect data pertaining to an input variable and to the output variable during a tuning procedure;

a signal generator that delivers a predetermined test reference signal to the valve positioner during the tuning procedure; and a computer program embodied on a computer readable medium for implementation on a computer that performs the steps of
(a) generating a plurality of sets of tuning parameters for use by the valve positioner during the tuning procedure;
(b) calculating a performance index associated with each of the plurality of sets of tuning parameters from the collected data pertaining to the input variable and the output variable generated in response to the delivery of the predetermined test reference signal to the valve positioner; and
(c) selecting one of the plurality of sets of tuning parameters as the set of operational tuning parameters based on the performance indices.

16. The auto-tuner of claim 15, wherein the output variable is indicative of a valve position.

17. The auto-tuner of claim 15, wherein the input variable comprises a current-to-pressure drive signal developed by a control algorithm of the valve positioner.

18. The auto-tuner of claim 15, wherein the data collector collects further data pertaining to an intermediate variable during the tuning procedure and the computer program calculates the performance indices from the collected further data pertaining to the intermediate variable.

19. The auto-tuner of claim 18, wherein the intermediate variable is a valve actuator pressure.

20. The auto-tuner of claim 15, wherein the signal generator develops a blocked sinusoidal signal during the tuning procedure.

21. The auto-tuner of claim 15, wherein the computer program calculates the performance index associated with one of the plurality of sets of tuning parameters as an expected value of further performance indices for each of a set of discrete changes in the predetermined test reference signal.

22. The auto-tuner of claim 15, wherein the tuning parameters comprise gains.

23. The auto-tuner of claim 15, wherein the computer program selects the set of tuning parameters associated with a minimum performance index as the set of operational tuning parameters.

24. The auto-tuner of claim 15, wherein the computer program calculates the performance index associated with each of the plurality of sets of tuning parameters as a function of a norm of a difference between the reference signal and the output variable and as a function of a norm of the input variable.

25. A method of automatically tuning a controller coupled within a process control loop, comprising the steps of:

generating a plurality of sets of tuning parameters for the controller;

forcing the process control loop through a test cycle while the controller uses each of the plurality of sets of tuning parameters;

measuring a response of the process control loop during the test cycle associated with each of the plurality of sets of tuning parameters;

calculating a performance index for each of the plurality of sets of tuning parameters based on the measured response; and selecting one of the sets of tuning parameters as a set of operational tuning parameters for the controller based on the calculated performance indices.

26. The method of claim 25, wherein the step of measuring includes the step of measuring an output variable and an input variable.

27. The method of claim 26, wherein the process control loop includes a valve and wherein the output variable is indicative of a valve position.

28. The method of claim 26, wherein the controller is a valve positioner that receives a drive signal and that includes a relay which is fluidly coupled to a valve actuator of a valve and wherein the input variable comprises one of the drive signal and a relay travel associated with the relay.

29. The method of claim 25, wherein the step of forcing the process control loop through a test cycle includes the step of delivering a test signal having a multiplicity of discrete changes therein to the controller and wherein the step of measuring the response includes the step of collecting a series of measurements for an input variable and for an output variable after each of the discrete changes in the test signal.

30. The method of claim 25, wherein the step of calculating a performance index includes the steps of determining a first norm associated with a difference between a reference signal and an output variable, determining a second norm associated with an input variable and combining the first and second norms.

* * * * *